United States Patent
Shahid et al.

(10) Patent No.: US 12,554,990 B2
(45) Date of Patent: Feb. 17, 2026

(54) NEURAL NETWORK FOR IDENTIFYING RADIO TECHNOLOGIES

(71) Applicants: IMEC VZW, Leuven (BE); UNIVERSITEIT ANTWERPEN, Antwerp (BE); UNIVERSITEIT GENT, Ghent (BE)

(72) Inventors: Adnan Shahid, Eke (BE); Jaron Fontaine, Oudenburg (BE); Eli De Poorter, Ghent (BE); Ingrid Moerman, Leuven (BE); Miguel Hernando Camelo Botero, Wilrijk (BE); Steven Latre, Lokeren (BE)

(73) Assignees: IMEC VZW, Leuven (BE); UNIVERSITEIT ANTWERPEN, Antwerp (BE); UNIVERSITEIT GENT, Ghent (BE)

( * ) Notice: Subject to any disclaimer, the term of this patent is extended or adjusted under 35 U.S.C. 154(b) by 1024 days.

(21) Appl. No.: 17/639,521

(22) PCT Filed: Sep. 4, 2020

(86) PCT No.: PCT/EP2020/074880
§ 371 (c)(1),
(2) Date: Mar. 1, 2022

(87) PCT Pub. No.: WO2021/044041
PCT Pub. Date: Mar. 11, 2021

(65) Prior Publication Data
US 2022/0300824 A1    Sep. 22, 2022

(30) Foreign Application Priority Data
Sep. 6, 2019    (EP) .................................... 19195811

(51) Int. Cl.
G06N 3/088    (2023.01)
G06N 3/048    (2023.01)
H04W 48/16    (2009.01)

(52) U.S. Cl.
CPC ............ G06N 3/088 (2013.01); G06N 3/048 (2023.01); H04W 48/16 (2013.01)

(58) Field of Classification Search
CPC .......... G06N 3/088; G06N 3/048; H04W 8/16
See application file for complete search history.

(56) References Cited

U.S. PATENT DOCUMENTS

| 11,544,529 B2 | 1/2023 | Ghaeini et al. |
| 2014/0073335 A1* | 3/2014 | Panchal ................ H04W 16/14 455/450 |

(Continued)

FOREIGN PATENT DOCUMENTS

| CN | 107038421 A | 8/2017 |
| CN | 108768907 A | 11/2018 |

(Continued)

OTHER PUBLICATIONS

Subeki et al. Spectrum Sensing for Cognitive Radio using Deep Autoencoder Neural Network and SVM, ICRAMET, 2018, pp. 81-85.*

(Continued)

Primary Examiner — Li Wu Chang
(74) Attorney, Agent, or Firm — Workman Nydegger

(57) ABSTRACT

A computer-implemented method providing a neural network for identifying radio technologies employed in an environment. The neural network includes an autoencoder having an encoder, and a classifier. The method has the steps of sensing a radio spectrum of the environment thereby obtaining a set of data samples, labelling a subset of the data samples by a respective radio technology thereby obtaining (Continued)

labelled data samples, training the autoencoder in an unsupervised way by unlabelled data samples, training the classifier in a supervised way by the labelled data samples, and providing the neural network by coupling the output of an encoder network of the autoencoder to an input of the classifier.

12 Claims, 6 Drawing Sheets

(56) References Cited

U.S. PATENT DOCUMENTS

| | | | | |
|---|---|---|---|---|
| 2014/0119421 | A1* | 5/2014 | El-Hassan | H04B 17/29 |
| | | | | 375/227 |
| 2020/0090023 | A1* | 3/2020 | Joseph | G06N 3/063 |
| 2020/0117863 | A1* | 4/2020 | Ha | G06K 19/07771 |

FOREIGN PATENT DOCUMENTS

| | | | |
|---|---|---|---|
| CN | 109690577 A | 4/2019 | |
| CN | 110166154 A | 8/2019 | |
| CN | 110166387 A | 8/2019 | |
| CN | 119128666 A | 12/2024 | |
| WO | WO-2005117353 A1 * | 12/2005 | ........ H04W 52/0245 |

OTHER PUBLICATIONS

Yu et al. "Radio Frequency Fingerprint Identification Based on Denoising Autoencoders", arXiv:1907.08809v1 [eess.SP] Jul. 20, 2019, pp. 6.*
Kokalj-Filipovic et al. "AutoEncoders for Training Compact Deep Learning RF Classifiers for Wireless Protocols", IEEE SPAWC, Jul. 2019, pp. 5.*
Kokalj-Filipovic et al. "AutoEncoders for Training Compact Deep Learning RF Classifiers for Wireless Protocols", SPAWC, 2019, pp. 5.*
O'Shea et al., "Convolutional Radio Modulation Recognition Networks," retrieved from the internet: https://ia902808.us.archive.org/32/items/arxiv-1602.04105/1602.04105.pgd, Jun. 10, 2016, pp. 1-15.
O'Shea et al., "Unsupervised Representation Learning of Structured Radio Communication Signals," 2016 First International Workshop on Sensing, Processing and Learning for Intelligent Machines (SPLINE), IEEE, Jul. 6, 2016, 5 Pages.
Wang et al., "Data-Driven Deep Learning for Automatic Modulation Recognition in Cognitive Radios," IEEE Transactions on Vehicular Technology, vol. 68, No. 4, Apr. 1, 2019, pp. 4074-4077.
West et al., "Deep Architectures for Modulation Recognition," arxiv.org, Cornell University Library, arXiv:1703.09197v1, Mar. 27, 2017, 7 Pages.
Extended Search Report from corresponding European Application No. 19195811.5, Feb. 26, 2020.
International Search Report and Written Opinion from PCT Application No. PCT/EP2020/074880, Nov. 6, 2020.
Chinese Office Action from corresponding CN Application No. 202080062600.4, Mar. 27, 2025.

* cited by examiner

NEURAL NETWORK FOR IDENTIFYING RADIO TECHNOLOGIES

FIELD OF THE INVENTION

The present invention generally relates to the field of identifying radio technologies employed by nodes for operating in an environment comprising one or more wireless networks that share a radio spectrum.

BACKGROUND OF THE INVENTION

Radio spectrum has become extremely crowded due to the advent of non-collaborative radio technologies that share the same spectrum. In this coexisting environment, interference is one of the critical challenges and if unsolved, this leads to performance degradations. Recognizing or identifying a radio technology that accesses the spectrum is fundamental to define spectrum management policies to mitigate interferences.

Cognitive radio, CR, has emerged as an enabling technology that provides support for dynamic spectrum access, DSA. It refers to the capability of sharing the spectrum among multiple technologies in an opportunistic manner. One of the critical problems that DSA faces is to identify if some technology is accessing the same spectrum and then take appropriate measures to combat the performance degradation due to interference. This problem is termed as the Technology Recognition, TR, problem, and it refers to identify radio signals of wireless technologies without requiring any signal pre-processing such as channel estimation, and timing and frequency synchronization.

Traditionally, TR is done by domain experts, which use carefully designed hand-crafted rules to extract features from the radio signals. On the contrary, state-of-the-art approaches based on machine learning methods may extract features directly from raw input data and perform recognition tasks on those features automatically.

However, state-of-the-art approaches for technology recognition using machine learning are based on supervised learning, which requires an extensive labelled data set to perform well. If the technologies and their environment are entirely unknown, the labelling task becomes time-consuming and challenging.

It is therefore an object of the present invention to alleviate to above drawback and to provide an improved solution for identifying radio technologies in an environment comprising one or more wireless networks.

SUMMARY OF THE INVENTION

This object is achieved, in a first aspect, by a computer-implemented method for providing a neural network for identifying radio technologies employed in an environment, the neural network comprising an autoencoder and a classifier, the method comprising the steps of:
  sensing a radio spectrum of the environment thereby obtaining a set of data samples;
  labelling a subset of the data samples by a respective radio technology thereby obtaining labelled data samples;
  training the autoencoder in an unsupervised way by unlabelled data samples;
  training the classifier in a supervised way by the labelled data samples; and
  providing the neural network by coupling the output of an encoder network of the autoencoder to the input of the classifier.

The environment comprises a plurality of nodes which operate in the environment. The nodes are, for example, user terminals, access points, gateways and/or base stations. A node that belongs to a wireless network uses one or more wireless radio technologies. In addition, a plurality of wireless networks also exists and work independently from each other. The wireless networks may operate on a same or partially overlapping spectrum.

As a first step, the environment is scanned by sensing a radio spectrum. This is, a part of the electromagnetic spectrum which is of interest is sensed on the presence of wireless signals. The sensing results in a set of data samples, which will be further processed.

The spectrum sensing is, for example, performed by capturing in-phase and quadrature, IQ, samples and may be performed using Software Defined Radio, SDR, platforms. Prior to further processing steps, the samples may, according to an embodiment, transformed depending on the model that subsequently will be trained. For example, the IQ samples which are time domain representation of radio signals, may be transformed into other domains such as frequency or time-frequency.

Next, a part or a subset of the data samples is selected and subsequently labelled in terms of a respective radio technology. In other words, a part of the data samples is chosen as being representative samples of the radio technologies and labelled. Preferably, here, domain expert knowledge or in combination with pseudo labelling, among other techniques, may be used. The labelled data samples with the associated labels may further be stored together with the other unselected and unlabelled samples.

The labelling may be performed by indicating to which class a given captured or sensed data sample belongs, or such a class label may be a name of a technology, or may further be more expressive and may comprise information about a spectrum utilized over time, central frequencies, duty cycle, or other information that may be related to the sample.

The storage may, for example, be performed in two databases. A first database then comprises a sample database, and a second database comprises a label database. Data samples, for example in the form of IQ samples, are stored in the sample database, while the label database may be used for storing the labels of a subset of the set of samples. Depending on the type of data, transformed or not, and a training step, the databases may be connected to one or more blocks.

Further, to provide the neural network a training is performed in two steps. First, an autoencoder is trained in an unsupervised way with the unlabelled data samples. An autoencoder is a neural network that is trained to copy its input to its output. An autoencoder is composed of two parts, an encoder and a decoder. The weights of the trained autoencoder are locked to preserve the important features that are learned during the unsupervised learning step. Second, after the unsupervised learning, a classifier is trained in a supervised way using the labelled data samples. During the supervised learning, the encoder is used as a feature extractor. This provides an initial bootstrapping on the classification task. Optionally, a fine-tuning step may be performed by, for example, retraining all the layers in the classifier to increase the accuracy of the resulting model. Then, when locked, the weights of the trained autoencoder may be unlocked.

Finally, after the training steps, the neural network is provided and is trained to be able to identify technologies on which it was trained for in different unknown and dynamic environments.

In the supervised learning step of the neural network, only a limited number of labelled data samples are needed. This makes the labelling task less time-consuming compared to the state-of-the-art machine learning methods for technology recognition. Thus, by this semi supervised learning approach for technology recognition by separating the feature extraction from the classification task in the neural network architecture, the use of unlabelled data is maximized. Furthermore, the use of domain expertise knowledge is only required when labelling few representative examples.

Another advantage is that even unknown radio technologies may be identified or recognized, without needing expert knowledge for either modelling signals of the environment or selecting required features such as modulation scheme, duty cycle, power level, etc., thereof.

According to an embodiment, the classifier comprises the encoder and a classification block.

The classification block is, for example, a SoftMax layer which is preceded by convolutional and/or dense layers to increase the accuracy of the classifier. Further, a non-normalized output of the classifier may be mapped to a probability distribution over predicted output of radio technologies.

According to an embodiment, the autoencoder comprises a convolutional neural network, CNN.

While traditional deep neural networks, DNNs, are built by connecting a series of fully connected layers, a CNN connects the neurons of a given layer, called convolutional layer, with only a few numbers of neurons of the next layer to reduce the computational complexity of learning. Preferably, in this embodiment the data samples comprise IQ samples as an input. Other types of input may be used as well, such as, for example, fast Fourier transform, FFT, samples.

According to an embodiment, the encoder comprises two convolutional layers with rectified linear unit, ReLU, activation function, each layer followed by a batch normalization and a dropout layer for regularization.

Downsampling in the autoencoder may be performed by using stride convolution or max-pooling layers. Further, the dropout layers allow the autoencoder, or preferably a deep autoencoder, DAE, to behave as a denoising DAE to improve its capacity as feature extractor.

According to an embodiment, the radio technologies comprise at least one of the group of 5G; 5G New Radio, NR; Long Term Evolution, LTE; Private LTE; Citizens Broadband Radio Service, CBRS; MulteFire; LTE-Licensed Assisted Access, LTE-LAA; Narrowband-Internet of Things, NV-IoT; Enhanced machine type communication, eMTC; 802.11ax; Wi-Fi 6; 802.11ah; 802.11af; 802.11p; vehicle to vehicle, V2V; vehicle to infrastructure, V2I; ZiBee; Bluetooth; WiMax; GSM.

In other words, a plurality of radio technologies may be identified by the neural network architecture. Further, besides the 5G and legacy wireless technologies, the neural network may be trained to identify any type of wireless radio technology in the radio spectrum, thus even unknown technologies may be identified.

According to a second aspect, the invention relates to the neural network according to the method of the first aspect.

The neural network may, for example, be trained with data samples captured from a range of environments. This allows identifying technologies in various unknown and dynamic environments.

According to a third aspect, the invention relates to a computer-implemented method for identifying radio technologies in an environment by the neural network according to the second aspect.

According to an embodiment, the computer-implemented method further comprises the step of changing a centre frequency of one of the radio technologies based on the identified radio technologies.

According to an embodiment, the computer-implemented method further comprises the step of assigning a collision-free time slot for transmission based on the identified radio technologies.

In other words, the computer-implemented method may employ different strategies to avoid a same use of the radio spectrum, and/or to make a shared use thereof in an efficient manner.

According to a fourth aspect, the invention relates to a data processing system comprising means for carrying out the method according to the first and/or third aspect.

According to a fifth aspect, the invention relates to a node for operating in a wireless network configured to identify radio technologies employed in an environment by the computer-implemented method according to the third aspect.

According to a sixth aspect, the invention relates to a computer program product comprising computer-executable instructions for causing a node to perform at least the steps of the computer-implemented method according to the third aspect.

According to a seventh aspect, the invention relates to a computer readable storage medium comprising the computer program product according to the sixth aspect.

BRIEF DESCRIPTION OF THE DRAWINGS

Some example embodiments will now be described with reference to the accompanying drawings.

DETAILED DESCRIPTION OF EMBODIMENT(S)

Figure 2:
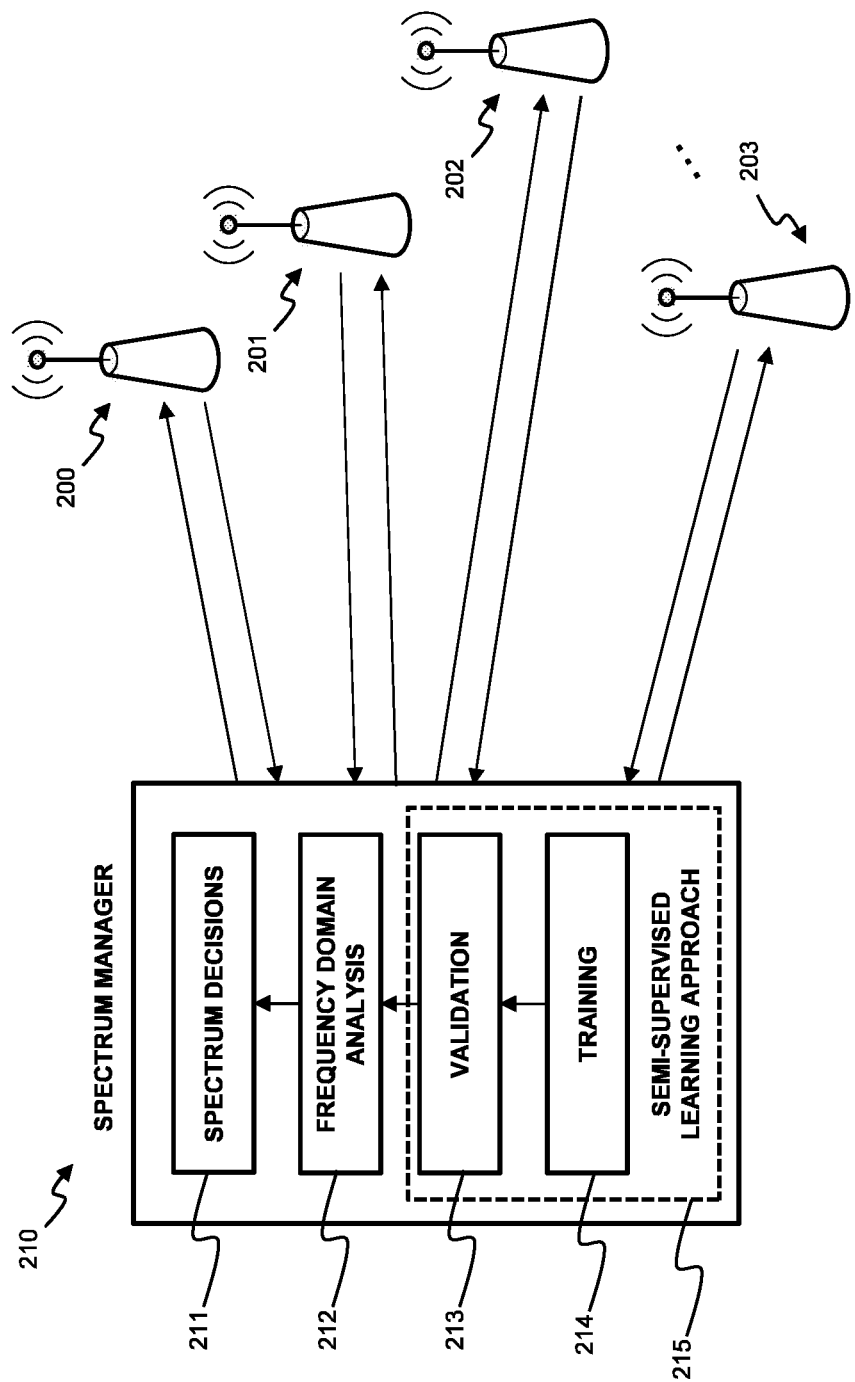
FIG. 2 illustrates a spectrum manager configured to recognize radio technologies.
Figure 3:
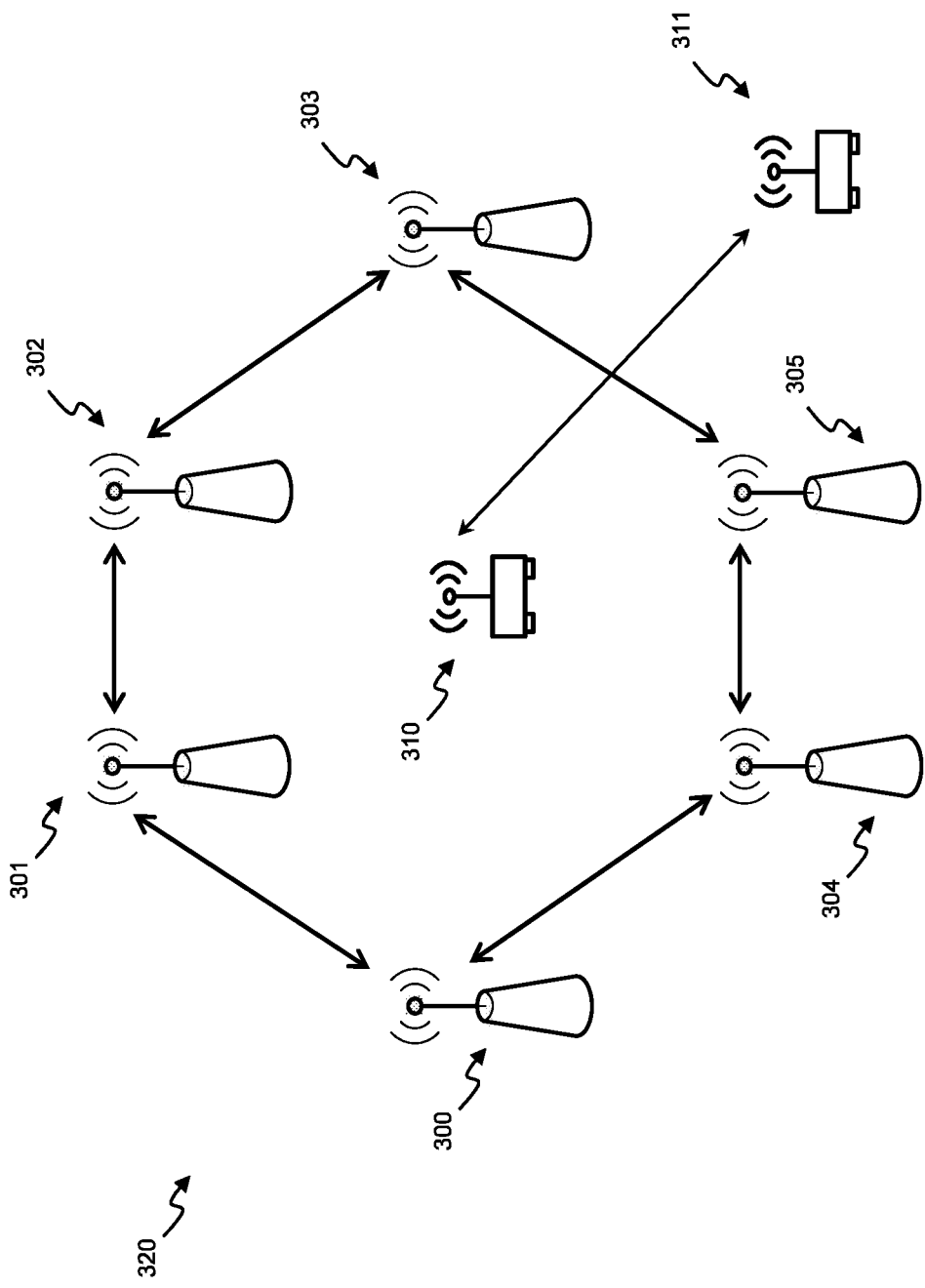
FIG. 3 illustrates two wireless networks each using a different radio technology.

In FIG. 3 two networks are illustrated. A first network comprises nodes 300-305 which are configured to communicate with each other through a first radio technology. The illustration further comprises a second network comprising nodes 310-311 which are likewise configured to communicate with each other through a second radio technology. The nodes 300-305 are not configured to communicate with the nodes 310-311, although they share a same or partially overlapping radio spectrum. Thus, both networks interfere and compete. Other networks may be present as well, which likewise compete and interfere. Thus, FIG. 3 illustrates an environment 320 wherein different radio technologies are present for wireless communication purposes. Different radio technologies are further illustrated in FIG. 2. The nodes or agents 200-203 each represent a radio technology which may operate in the environment 320.

Figure 4:
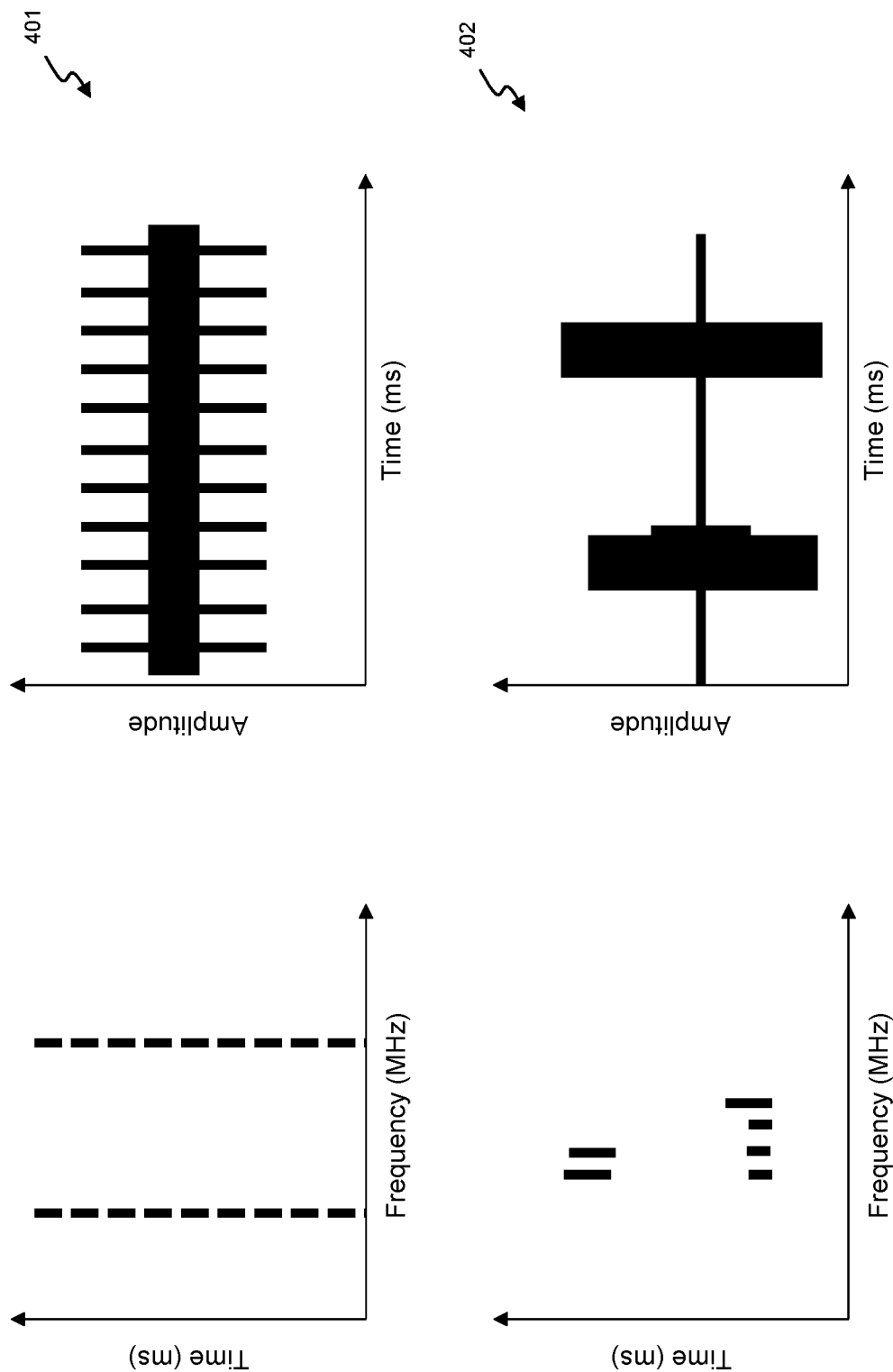
FIG. 4 illustrates time and time-frequency signatures of wireless technologies.

A radio technology may further be illustrated through a time and time-frequency signatures of the wireless technologies to be recognized. This is illustrated in FIG. 4 wherein two distinct 401 and 402 radio technologies are illustrated. Radio technology 401 is, for example, deployed by nodes 300-305 and radio technology 402 is deployed by nodes 310-311.

A spectrum manager 210 will identify the different radio technologies 200-203 operating in the environment 320. The results of the spectrum manager 210, thus the technology recognition may then be used by making spectrum decisions 211. The goal of the spectrum manager 210 is to assist the unknown wireless technologies 200-203 to make spectrum decisions 211 by first identifying them and then doing frequency domain analysis. In order to enable this, the spectrum manager 210 executes the following tasks in the listed manner: training 214, validation 213, frequency domain analysis 212, and spectrum decision 211. In this illustrative embodiment, the focus will now be on the training 214 and validation 213 steps to enable technology recognition for cognitive radio systems.

The training 214 task is used to train a model in a semi-supervised 215 way with raw in-phase and quadrature, IQ, samples of a number of radios 200-203 using a deep autoencoder, DAE. Further, once the model is trained 214, in the validation task 213, it may identify the unknown wireless technologies 200-203. In the frequency domain analysis task 212, frequency domain analysis of the identified technologies 200-203 is done by extracting spectrum occupancy information of the technologies 200-203. Finally, in the spectrum decision task 211, the radio uses the extracted spectrum efficiency information to define actions, such as change the frequencies of the radios 200-203 and/or assign a collision-free time slot for transmissions, so that a fair coexistence may be realized. Once the spectrum decisions are made, they are notified to the radios 200-203 via, for example, control channels.

To formulate a technology recognition problem, a communication system in which a received signal r(t) may be represented as follows:

$$r(t)=s(t)*h(t)+\omega(t) \quad \text{(Eq. 1)},$$

wherein s(t) is the original transmitted signal, h(t) is the time varying impulse response of the transmit channel, and ω(t) represents additive white gaussian noise, AWGN, with zero mean and variance $\sigma^2$. In modern digital communication systems, the transmitted signal s(t) is modelled as follows:

$$s(t)=I(t)\cos(2\pi f_c t)+Q(t)\sin(2\pi f_c t), s(t)=i(t)+jq(t) \quad \text{(Eq. 2)},$$

where s(t) is called quadrature signal or IQ samples, and the i(t) and q(t) are termed as the in-phase and quadrature components, respectively.

Given a classification problem with an input vector set X and their corresponding target variables set Y, the objective is to find a function f that predicts y∈ Y given a new value for x∈ X, where y represents L class labels:

$$f: \mathbb{R}^n \rightarrow 1, \ldots, L \quad \text{(Eq. 3)}$$
$$y = f(x).$$

Let $X=\{x_1, x_2, \ldots, x_N\}$ and $Y=\{y_1, y_2, \ldots, y_N\}$ be a set of N examples of radio technologies and their corresponding labels, respectively, where $x_i \in X$ and $y_i \in Y$ for all $i \in [N]:=\{1, 2, \ldots, N\}$. By semi-supervised learning, SSL, the set X is divided in two subsets $X_s=\{x_1, x_2, \ldots, X_L\}$, for which their corresponding labels $Y_s=\{y_1, y_2, \ldots, y_L\}$ are provided, and $X_u=\{x_{L+1}, \ldots, x_N\}$, for which no labels are provided such that $X=\{x_1, x_2, \ldots, x_L, x_{L+1}, \ldots, x_N\}$.

To use SSL algorithms for recognition, it is further required that the knowledge acquired about the distribution of the examples from the unlabelled data set, i.e., p(x), is useful to infer p(y|x). Otherwise, semi-supervised learning may decrease the performance of the supervised classifier by misguiding it during the learning process. SSL uses unlabelled data to learn valuable information about the data, and then uses it to finetune a classifier with a reduced number of labels. Through the invention, the technology recognition system can be used even when the environment 320 is entirely unknown and no information is provided at all.

Figure 5:
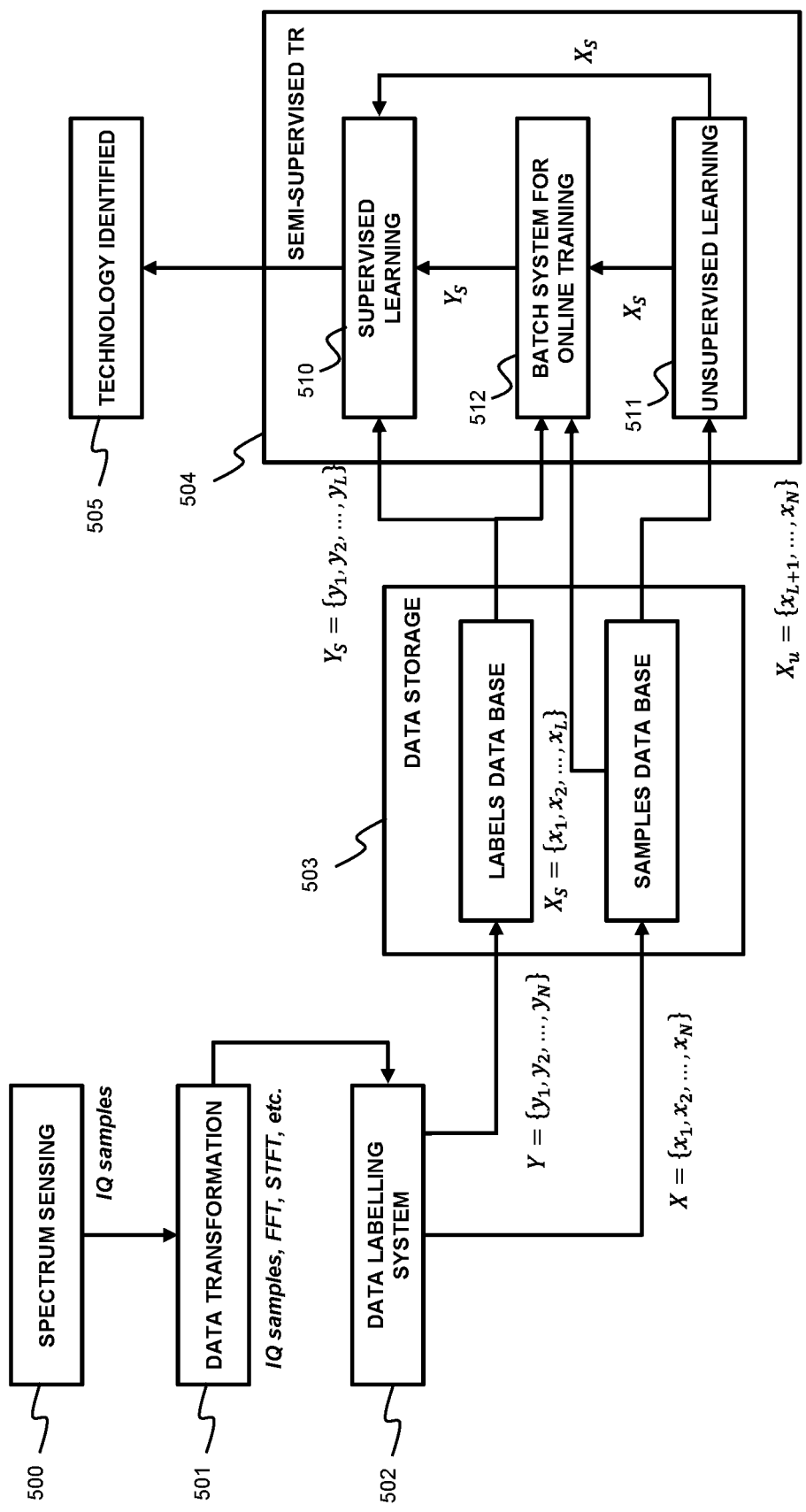
FIG. 5 illustrates a workflow of a semi-supervised learning approach according to an embodiment of the invention.

Through sensing and capturing over-the-fly radio signals in the form of IQ samples is performed using Software Defined Radio, SDR, platforms. Next, by the invention the feature extraction is decoupled via unsupervised learning, and the classification tasks via supervised learning while keeping the high expressiveness of deep learning, DL, models. The overall workflow of the semi-supervised learning approach by the invention is illustrated in FIG. 5.

In a first step 500, the spectrum is sensed by capturing IQ samples which are further processed by subsequent steps 501-505. Next, depending on the model to be trained, the original IQ samples, which are time domain representation of radio signals may be transformed 501 into other domains, such as frequency or time-frequency. When IQ samples representation are further used no further processing is required.

In the next step 502, the data is labelled. In this step, two sub steps are performed, namely samples selection and labelling of the samples. The architecture of the invention is semi-supervised, thus making it important to select representative samples of the radio technologies that needs to be identified. Here, domain expert knowledge or in combination with pseudo labelling may be used. The samples and the labels associated with the labelled samples are further stored 503.

This data storage 503 block comprises two databases, namely a sample database and a label database. IQ samples are stored in the sample database, while the label database is used for storing labels of a reduced set of examples. Depending on the kind of data and the training strategy, the databases are connected to one or more blocks, namely the supervised learning 510 and the unsupervised learning 511, and the batch system 512.

In the offline training, the input data is created by selecting a portion of the data from the sample database via a predefined strategy, for example uniform random selection.

Next, in the batch system for online training 512, on the other hand, the input may be provided by a batch system that takes data from the sample database 503 and uses it for retraining a model.

The semi-supervised technology recognition classification block 504 receives the sensed data and performed the classification task. The block 504 also receives a limited labelled data set from the data labelling system block 502. Based on the labelled and unlabelled data sets, different learning algorithms may be used in the supervised 510 and unsupervised 511 learning blocks, and how they interact to perform the SSL task.

Finally, in the technology recognition block 505 the proposed architecture indicates which class a given capture sample belongs to. This may, for example, be the name of the technology, but may also be more expressive and comprises information about spectrum utilized over time, central frequencies, duty cycle, etc.

The proposed workflow of the invention is flexible to support a range of SSL algorithms, training methods, and input types. The selection of the semi-supervised approach mainly depends on various factors including the amount of available data, the number of labels, the complexity of the radio signals to be identified, and the need for offline or online training capabilities, etc.

Figure 1:
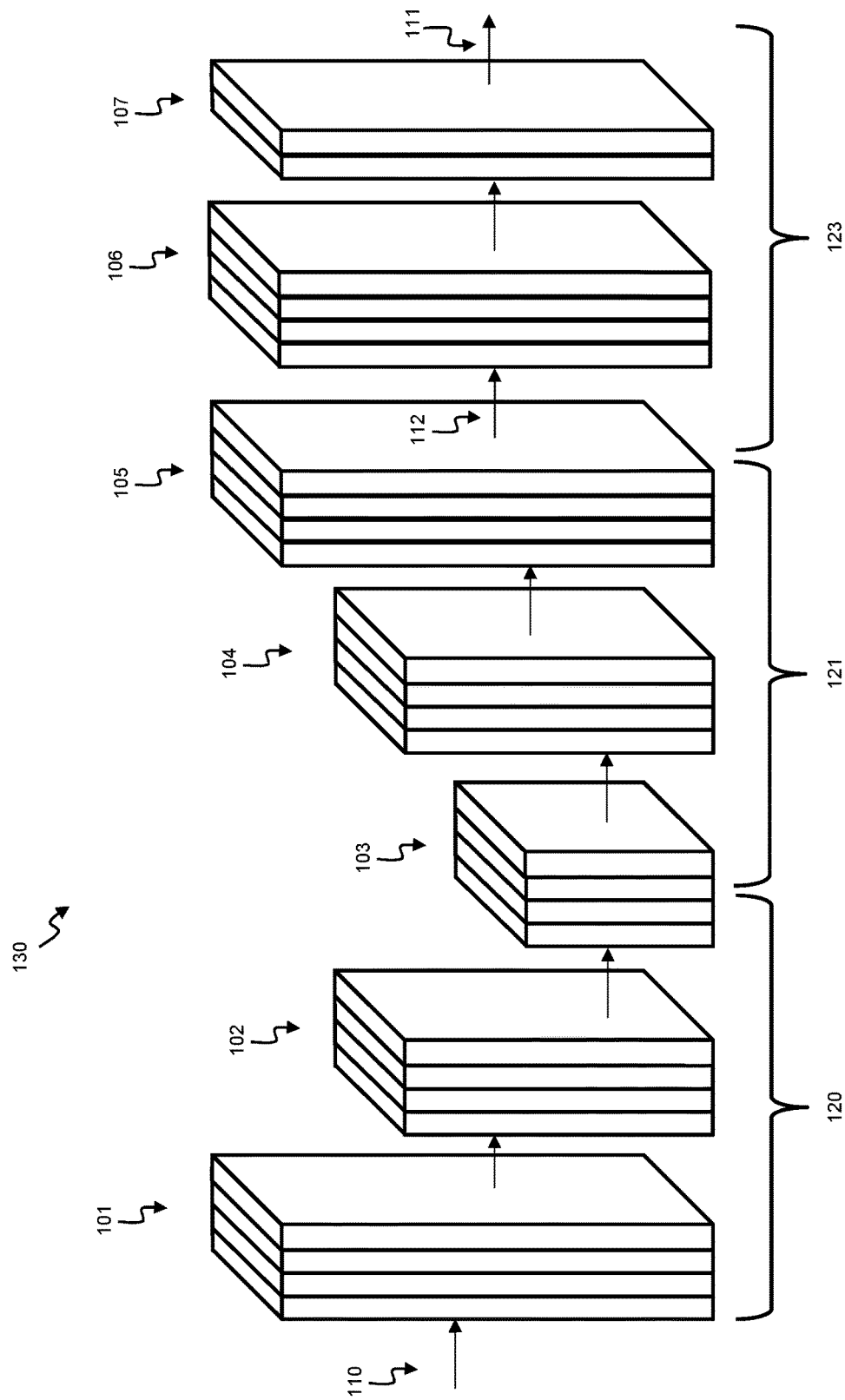
FIG. 1 illustrates a semi-supervised algorithm implemented using a deep autoencoder according to an embodiment of the invention.

The SSL TR block illustrated in FIG. 5 may be implemented using a DAE 130 as illustrated in FIG. 1. The DAE 130 is composed of two parts, an encoder 120 that maps h=f(x), where h is known as the code, and a decoder 121 that produces a reconstruction r=g(h).

As an input 110 for the DAE 130 IQ samples or any transformation of the radio signals of the different radio technologies are provided. Next, the encoder 120 comprises a first convolutional layer 101, for example with a 3×3 filter kernel, 64 feature maps, 4×4 strides and a dropout of 0.4. The second convolutional layer 102 comprises a 3×3 filter kernel, 64 feature maps, 4×4 strides and a dropout of 0.4. Next, there is a fully connected 1×125 neurons layer 103. Next, there is a first transpose convolutional layer 104 comprising a 3×3 filter kernel, 64 feature maps, 1×4 strides and a dropout of 0.4, and a second transpose convolutional layer 105 comprising a 3×3 filter kernel, 64 feature maps, 1×4 strides and a dropout of 0.4. The output 112 of the DAE 120-121 is further used by the encoder 123 which comprises a fully connected 1×128 neurons 106 and a Softmax layer 107 comprising 1×17 neurons. The number of convolutional layers, feature maps, strides, dropout, filter size, etc are termed as hyperparameters in machine learning terms and for each specific case a different combination of them may be used. The modelling by the DAE 120-121 is performed through unsupervised learning with unlabelled examples and by the encoder 123 through supervised learning with representative labelled examples. The specific parameters of each layer, etc., may be determined using a hyperparameter swapping. The encoder configuration of the invention generates an intermediate code of size 128, e.g., a reduction factor of 16x. Similarly, the decoder part follows the same pattern but in reverse order and replacing convolutional layers by transposed convolutional layers. The DAE 130 comprises 1M of trainable parameters. The autoencoder is trained by using batches of size 128, the Adam optimizer with a learning rate of 0.0004, and binary cross-entropy as the loss function for reconstruction. The supervised part of the architecture is composed of the encoder part of the DAE in addition to two dense layers, one with 128 neurons, and the second one with 17 neurons and a SoftMax activation layer for classification. The resulting model has 500 k and 18 k trainable parameters in phase 1 and phase 2, respectively. The model is trained using the same parameters as the DAE except that the loss function is categorical cross-entropy and the learning rate is reduced to 0.004. Finally, the output 111 is generated.

Thus, differently formulated, for SSL, the DAE 130 provides a two-step training process. First, the DAE 130 which is composed of the encoder 120 and the decoder 21 in an unsupervised way using only $X_u$. Secondly, after the unsupervised learning, a training is performed by a classifier 123 using an encoder 106 together with a Softmax classifier 107 in a supervised way using the reduced labelled data set $X_s$.

During the supervised training, the encoder 106 is used as a feature extractor for the Softmax classifier 107. This step provides an initial bootstrapping on the classification task. Then, a fine-tune step is performed, this is, all layers in 123 are retrained in order to increase the accuracy of the resulting model.

Figure 6:
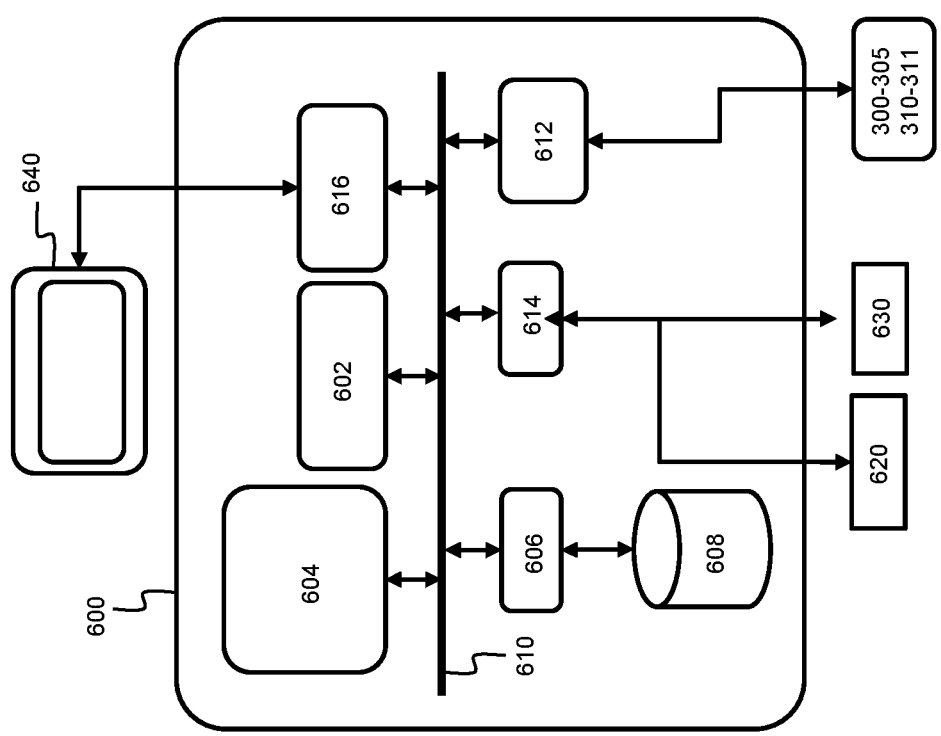
FIG. 6 shows an example embodiment of a suitable computing system for performing one or several steps in embodiments of the invention.

FIG. 6 shows a suitable computing system 600 enabling to implement embodiments of the method for identifying radio technologies in an environment according to the invention. Computing system 600 may in general be formed as a suitable general-purpose computer and comprise a bus 610, a processor 602, a local memory 604, one or more optional input interfaces 614, one or more optional output interfaces 616, a communication interface 612, a storage element interface 606, and one or more storage elements 608. Bus 610 may comprise one or more conductors that permit communication among the components of the computing system 600. Processor 602 may include any type of conventional processor or microprocessor that interprets and executes programming instructions. Local memory 604 may include a random-access memory (RAM) or another type of dynamic storage device that stores information and instructions for execution by processor 602 and/or a read only memory (ROM) or another type of static storage device that stores static information and instructions for use by processor 602. Input interface 614 may comprise one or more conventional mechanisms that permit an operator or user to input information to the computing device 600, such as a keyboard 620, a mouse 630, a pen, voice recognition and/or biometric mechanisms, a camera, etc. Output interface 616 may comprise one or more conventional mechanisms that output information to the operator or user, such as a display 640, etc. Communication interface 612 may comprise any transceiver-like mechanism such as for example one or more Ethernet interfaces that enables computing system 600 to communicate with other devices and/or systems, for example with other one or more of the nodes 300-305 or 310-311. The communication interface 612 of computing system 600 may be connected to such another computing system by means of a local area network (LAN) or a wide area network (WAN) such as for example the internet. Storage element interface 606 may comprise a storage interface such as for example a Serial Advanced Technology Attachment (SATA) interface or a Small Computer System Interface (SCSI) for connecting bus 910 to one or more storage elements 608, such as one or more local disks, for example SATA disk drives, and control the reading and writing of data to and/or from these storage elements 908. Although the storage element(s) 608 above is/are described as a local disk, in general any other suitable computer-readable media such as a removable magnetic disk, optical storage media such as a CD or DVD, -ROM disk, solid state drives, flash memory cards, . . . could be used. Computing system 600 could thus correspond to a node in the embodiments illustrated by FIG. 2 or FIG. 3.

As used in this application, the term "circuitry" may refer to one or more or all of the following:
(a) hardware-only circuit implementations such as implementations in only analog and/or digital circuitry and (b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described

The invention claimed is:

1. A computer-implemented method for providing a neural network for identifying radio technologies employed in an environment, the neural network comprising an autoencoder having an encoder, and a classifier, the method comprising the steps of:
sensing a radio spectrum of the environment thereby obtaining a set of data samples;
selecting data samples indicative of a respective radio technology from the set of data samples, thereby obtaining a subset of the data samples;
labelling the subset of the data samples by the respective radio technology thereby obtaining labelled data samples;
obtaining a trained encoder for extracting characteristic features from unlabelled data samples by training the autoencoder in an unsupervised way based on the unlabelled data samples;
training the classifier in a supervised way based on characteristic features extracted from the labelled data samples by means of the trained encoder and
by coupling the output of the trained encoder to the input of the classifier.

2. The computer-implemented method according to claim 1, wherein the set of data samples comprises in-phase and quadrature, IQ, samples.

3. The computer-implemented method according to claim 2, further comprising the step of:
transforming the IQ samples from a time domain to a frequency domain.

4. The computer-implemented method according to claim 1, wherein the neural network comprises the trained encoder and a classification block.

5. The computer-implemented method according to claim 1, wherein the autoencoder comprises a convolutional neural network.

6. The computer-implemented method according to claim 1, wherein the encoder comprises two convolutional layers with rectified linear unit, ReLU, activation function, each layer followed by a batch normalization and a dropout layer for regularization.

7. The computer-implemented method according to claim 1, wherein the radio technologies comprise at least one of the group of 5G; 5G New Radio, NR; Long Term Evolution, LTE; Private LTE; Citizens Broadband Radio Service, CBRS; MulteFire; LTE-Licensed Assisted Access, LTE-LAA; Narrowband-Internet of Things, NV-IoT; Enhanced machine type communication, eMTC; 802.11ax; Wi-Fi 6; 802.11ah; 802.11af; 802.11p; vehicle to vehicle, V2V; vehicle to infrastructure, V2I; ZigBee; Bluetooth; WiMax; GSM.

8. A computer-implemented method comprising identifying radio technologies employed in an environment by a neural network obtained by claim 1.

9. The computer-implemented method according to claim 8, further comprising the step of:
changing a centre frequency of one of the radio technologies based on the identified radio technologies.

10. The computer-implemented method according to claim 8, further comprising the step of:
assigning a collision-free time slot for transmission based on the identified radio technologies.

11. A data processing system comprising a processor and a non-transitory computer readable storage medium comprising computer-executable instructions for causing the processor to perform a computer-implemented method for providing a neural network for identifying radio technologies employed in an environment, the neural network comprising an autoencoder having an encoder, and a classifier, the method comprising the steps of:
sensing a radio spectrum of the environment thereby obtaining a set of data samples;
selecting data samples indicative of a respective radio technology from the set of data samples, thereby obtaining a subset of the data samples;

labelling the subset of the data samples by the respective radio technology thereby obtaining labelled data samples;

obtaining a trained encoder for extracting characteristic features from unlabelled data samples by training the autoencoder in an unsupervised way based on the unlabelled data samples;

training the classifier in a supervised way based on characteristic features extracted from the labelled data samples by means of the trained encoder and by coupling the output of the trained encoder to the input of the classifier.

12. A non-transitory computer readable storage medium comprising a computer program product comprising computer-executable instructions for causing a data processing system to perform a computer-implemented method for providing a neural network for identifying radio technologies employed in an environment, the neural network comprising an autoencoder having an encoder, and a classifier, the method comprising the steps of sensing a radio spectrum of the environment thereby obtaining a set of data samples;

selecting data samples indicative of a respective radio technology from the set of data samples, thereby obtaining a subset of the data samples;

labelling the subset of the data samples by the respective radio technology thereby obtaining labelled data samples;

obtaining a trained encoder for extracting characteristic features from unlabelled data samples by training the autoencoder in an unsupervised way based on the unlabelled data samples;

training the classifier in a supervised way based on characteristic features extracted from the labelled data samples by means of the trained encoder and by coupling the output of the trained encoder to the input of the classifier.

\* \* \* \* \*